UNITED STATES PATENT OFFICE.

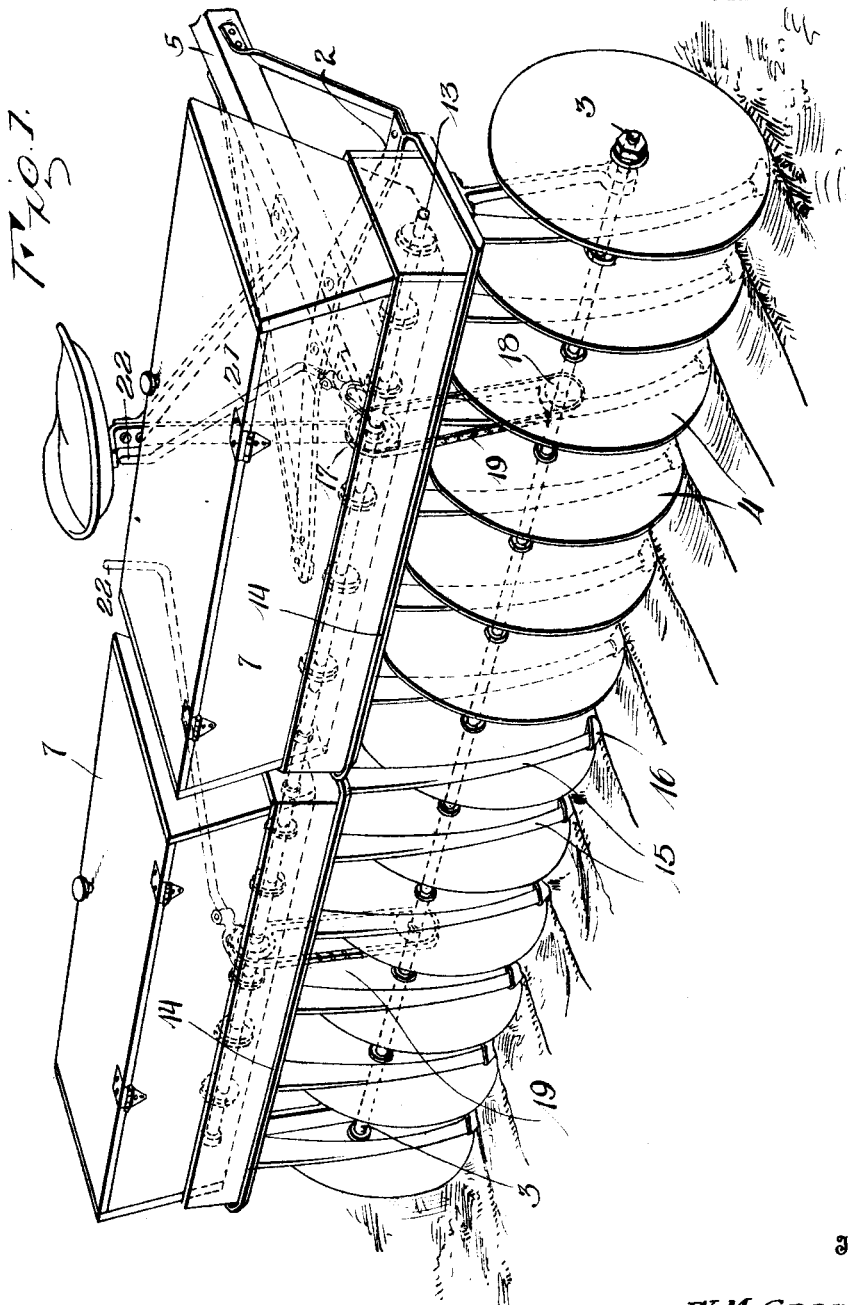

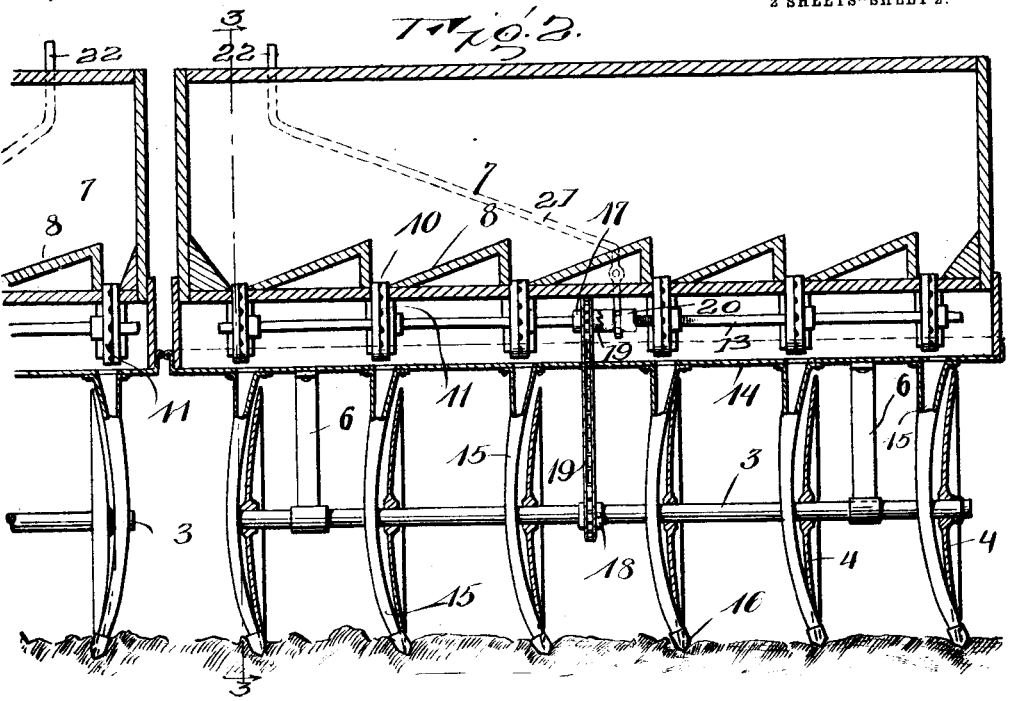
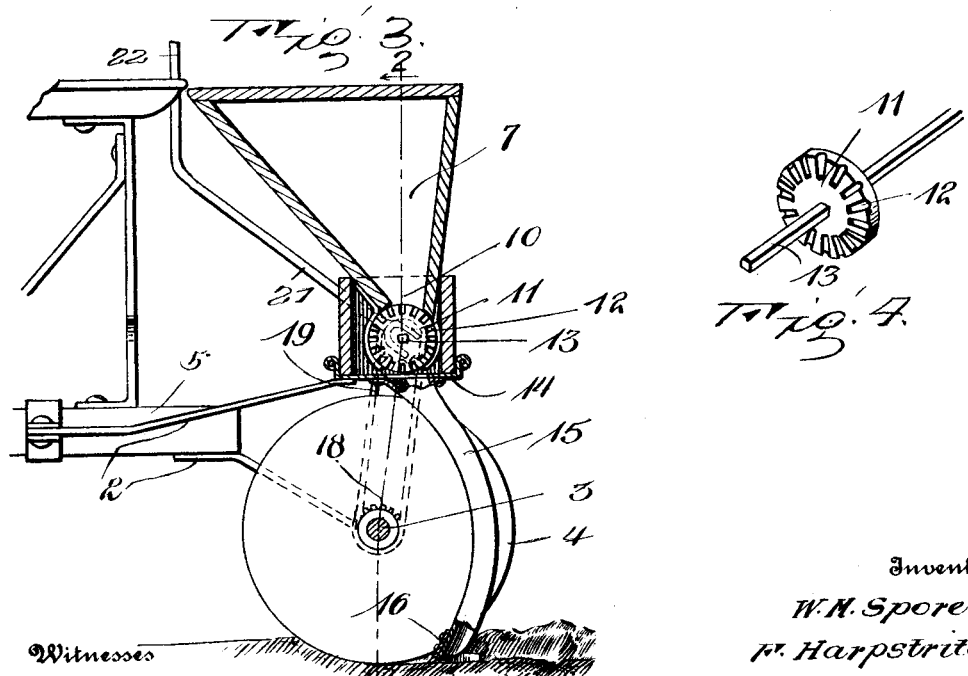
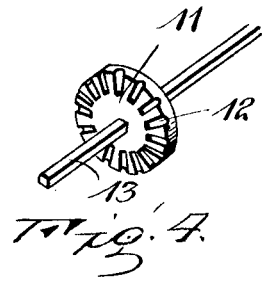

WILLIAM M. SPORE, OF CISCO, AND FREDERICK HARPSTRITE, OF DECATUR, ILLINOIS.

DRILLING ATTACHMENT FOR DISK HARROWS.

1,109,711.  Specification of Letters Patent.  Patented Sept. 8, 1914.

Application filed November 25, 1913. Serial No. 802,954.

*To all whom it may concern:*

Be it known that we, WILLIAM M. SPORE and FREDERICK HARPSTRITE, citizens of the United States, residing at Cisco and Decatur, respectively, in the counties of Piatt and Macon, respectively, and State of Illinois, have invented certain new and useful Improvements in Drilling Attachments for Disk Harrows, of which the following is a specification.

Our invention relates to agricultural machinery and particularly to drills.

The primary object of our invention is the provision of an attachment adapted to be disposed upon the frame of a disk harrow or pulverizer whereby the disk harrow or pulverizer may be used for planting seeds.

A further object of the invention is to provide an attachment of this character which may be readily adapted for use with harrows using large or small disks or a greater or less number of harrow disks.

A further object of the invention is to provide a very simple drill mechanism of this character and to improve the details of construction of these attachments.

Our invention is illustrated in the accompanying drawings wherein:

Figure 1 is a perspective view of a harrow provided with our attachment. Fig. 2 is a vertical section on the line 2—2 of Fig. 3. Fig. 3 is a fragmentary vertical sectional view on the line 3—3 of Fig. 2. Fig. 4 is a detail view of one of the feed disks.

Corresponding and like parts are referred to in the following description and indicated in all the views of the accompanying drawings by the same reference characters.

Referring to these drawings, 2 designates the frame of an ordinary disk harrow, this frame supporting the disk shaft 3 upon which a plurality of harrow disks 4 are mounted. These harrow disks are of the usual construction. The disk frame is, of course, provided with a tongue, with a seat, and with the usual weight box or weight supporting platform.

Supported upon the harrow frame and preferably upon the weight boxes thereof are a pair of seed boxes 7. Preferably these seed boxes are supported upon the legs 6 which are suitably braced upon the tongue 5.

Our attachment comprises a pair of seed boxes 7 each of such length and width as to be supported upon one of the legs 6. Each seed box is formed with an upper bottom constructed to provide a plurality of relatively shallow hoppers 8, the total number of hoppers in the boxes corresponding in number to the number of disks 4. Each hopper 8 discharges the contents into a slot 10 within which is disposed the feeding disk 11. These feeding disks are of any usual or ordinary form but as illustrated each disk is provided with a plurality of radially extending grooves or pockets 12. Each series of feeding disks is mounted upon a common shaft 13, this shaft being preferably square in cross section and mounted in suitable bearings below the bottom of the seed box.

Disposed below the bottom of the seed container is a housing which rests upon the weight boxes 14 or platforms, the bottom of each weight box being provided with a plurality of grain tubes or ducts 15. Each grain tube or duct leads downward in a curve and is provided at its lower end with a plow-shaped shoe 16. This grain duct or spout 14 is so curved that it discharges its contents at a point well under the corresponding disk 4, insuring the seed being placed in moist ground at a good depth. Each shaft 13 is operated by means of a sprocket wheel 17 disposed over a sprocket wheel 18 mounted upon the shaft 3. A sprocket chain 19 connects these sprocket wheels. By this means the seed dropping shaft or feed shaft 13 is operated by the rotation of the shaft 3. The sprocket wheel 17 is preferably loosely mounted upon the shaft 13 and is formed with clutch-teeth on one face. Shiftably mounted on each shaft 13 is a clutch-member 20 having clutch-teeth confronting the clutch-teeth on the sprocket-wheel 17. This clutch-member 20 is splined upon the shaft 13 and is shiftable into or out of engagement with the sprocket-wheel 17 by means of a shipper lever 21 having arms engaging in a groove formed in the clutch-member. This shipper lever is operatively connected to a hand-lever 22, whereby it may be operated. In the construction illustrated as there are two shafts 13 there will be two sets of clutch-members, each controlled by its own individual lever 22.

It is to be noted that the member 14 may either be the ordinary weight box of a harrow provided with downwardly extending spouts or that the ordinary weight box of the harrow may be removed and the weight box formed with the spouts be applied thereto. After the weight box 14 formed with the spouts is applied to an ordinary form of harrow and when it is desired to use the harrow alone the seed box with its housing may be readily removed and weights may be placed on the upper face of the member 14. This placing of the weights upon this member being permitted by the fact that the spouts 15 do not project above the upper face of the member 14. When it is desired to use the device as a seed planter, the seed box with its housing may be disposed upon the member 14, the sprocket wheels on the seed shaft and disk shaft connected by the sprocket chains and the device will then be entirely capable of use with a planter.

The operation of our invention will be obvious from what has gone before. This attachment may be applied to any ordinary or usual form of disk harrow and when in use it will act to deposit the seeds passing from the several compartments in the furrow behind the several disks and at a point as near the lowest portion of the disks as possible so that the seed may be planted in moist ground. A rotation of the shaft 3 will, of course, cause a constant rotation of the feeding shaft when the clutches 20 are thrown in and the feed disks mounted thereon which will cause the seed to be fed down in the usual manner through the spouts 15.

While we have illustrated what we believe to be the simplest and most effective form of our attachment, it is, of course, obvious that minor changes may be made therein without departing from the spirit of the invention.

What we claim is:

1. The combination with a harrow including a supporting frame, weight boxes supported upon the frame, a rotatable shaft and harrow disks mounted at spaced intervals upon said shaft, of a drilling attachment therefor comprising a removable seed box, a feed shaft mounted upon and supported below the seed box and operatively connected to the harrow shaft to rotate therewith, a plurality of seed disks operating in slots formed in the bottom of the seed box and controlling the passage of seed from the seed box, and seed discharging spouts, one below each seed disk mounted upon the weight box and each discharging behind one of the harrow disks.

2. The combination with a harrow including a supporting frame, a weight box, a rotatable shaft and a plurality of disk harrows supported upon the shaft, of a removable seed box, a housing mounted upon the lower end of the seed box and extending down to and resting upon the upper face of the weight box, each seed box being formed to provide a plurality of hoppers, the lower end of each hopper having slots, a shaft mounted below the bottom of the seed box, seed disks mounted on said shafts and operating partially in the slots of each hopper, a plurality of seed spouts extending from the bottom of the weight box beneath each of said feed disks and discharging each behind one of the harrow disks, and detachable operative connections between the feed shaft and the harrow disk shaft.

3. A seeding attachment for disk harrows, comprising a seed box, a housing having downwardly extending spouts attached to the bottom of the seed box, a member upon which the housing rests and from which the housing is detachable, said member being adapted to constitute a weight box when the housing and seed box are removed, seed spouts extending down from said member and discharging adjacent the lower edges of the harrow disks, a shaft mounted in the housing extending below the seed box, a plurality of seed disks upon each shaft coacting with slots formed in the bottom of the seed box, said seed disks discharging into said spouts, and detachable means for operatively connecting the seed shaft to the harrow disk shaft.

In testimony whereof we affix our signatures in presence of two witnesses.

WILLIAM M. SPORE. [L. S.]
FREDERICK HARPSTRITE. [L. S.]

Witnesses:
G. D. SPORE,
ROBINSON CONN.

---

Copies of this patent may be obtained for five cents each, by addressing the "Commissioner of Patents, Washington, D. C."